United States Patent [19]
Chernack

[11] Patent Number: 5,924,661
[45] Date of Patent: Jul. 20, 1999

[54] DEVICE FOR LEVELLING AND STABILIZING AN ARTICLE OF FURNITURE

[76] Inventor: Milton Chernack, 399 June Pl., Hempstead, N.Y. 11552

[21] Appl. No.: 08/887,768

[22] Filed: Jul. 3, 1997

[51] Int. Cl.$^6$ .................................................. F16M 11/24
[52] U.S. Cl. ........................................................ 248/188.2
[58] Field of Search .............................. 248/188.2, 188.1, 248/188.3, 346.11; 5/640, 644, 911; 482/49

[56] References Cited

U.S. PATENT DOCUMENTS

| | | | |
|---|---|---|---|
| 1,912,728 | 6/1933 | De Frost Roe . | |
| 1,982,138 | 11/1934 | Herold | 45/137 |
| 2,219,974 | 10/1940 | Bellow | 220/69 |
| 2,450,927 | 10/1948 | Allen | 248/104 |
| 2,956,287 | 10/1960 | Stanford | 4/110 |
| 3,030,730 | 4/1962 | Costar | 45/139 |
| 3,043,049 | 7/1962 | Gleason | 45/139 |
| 3,326,508 | 6/1967 | Born | 248/346.1 |
| 4,130,263 | 12/1978 | Roericht | 248/371 |
| 4,192,329 | 3/1980 | Swearingen | 132/79 R |
| 4,501,401 | 2/1985 | Conee | 248/346 |
| 4,577,358 | 3/1986 | Glass | 5/455 |
| 4,667,356 | 5/1987 | Holmquist | 5/911 |
| 4,689,844 | 9/1987 | Alivizatos | 5/911 |
| 4,788,916 | 12/1988 | Saxton | 108/43 |
| 4,815,623 | 3/1989 | Levin | 220/17.1 |
| 4,830,320 | 5/1989 | Bellows | 248/188.2 |
| 5,079,787 | 1/1992 | Pollmann | 5/911 |
| 5,332,185 | 7/1994 | Walker, III | 248/346 |
| 5,350,147 | 9/1994 | Paganus | 248/346 |
| 5,445,349 | 8/1995 | Hart | 248/118 |
| 5,475,882 | 12/1995 | Sereboff | 3/450 |
| 5,476,491 | 12/1995 | Mayn | 248/118 |
| 5,492,292 | 2/1996 | Richards | 248/188.2 |
| 5,718,655 | 2/1998 | Phillips | 482/49 |

*Primary Examiner*—Ramon O. Ramirez
*Assistant Examiner*—Anita M. King
*Attorney, Agent, or Firm*—Cohen, Pontani, Lieberman & Pavane

[57] ABSTRACT

A device for stabilizing or leveling an article of furniture is formed of a deformable outer envelope enclosing a second elastically deformable envelope that is substantially filled with a filler material of a plurality of bead-like particles. The filler material particles, which are preferably smooth-surface glass beads, provide fluidic flowability of the filler material so that, when the stabilizing device is inserted and pressed between an underlying support surface and the lower support structure of an article of furniture to fill a space or gap otherwise present between the support structure and support surface, the inner envelope resiliently deforms to accommodate the redistribution of the particles and dynamically fill the gap, thus stabilizing the article of furniture on the support surface.

13 Claims, 3 Drawing Sheets

DEVICE FOR LEVELLING AND STABILIZING AN ARTICLE OF FURNITURE

BACKGROUND OF THE INVENTION

1. Field of the Invention

The present invention is generally directed to levelling and stabilizing articles of furniture and the like. More particularly, the invention is directed to a dynamically-adjustable stabilizing device which is insertable between a support surface and the lower support structure of an article of furniture, such as a chair or table leg or the like, to level and stabilize the article.

2. Description of the Related Art

Most articles of furniture are usually supported by lower support members which often have more than three potential support points. Examples include articles of furniture such as tables, which have four or more downwardly depending legs, articles having a plurality of horizontal runners adapted to abut the support surface, and pedestal supported articles. Unless unusual care is taken, it is not uncommon to find that the lower support structures of these articles do not terminate in a common support plane. When this happens, the articles of furniture do not have a single stable support plane but, rather, are subject to unwanted wobbling or tipping. This also occurs in the even more common situation where the floor or other support surface is not exactly flat or even at the location at which the article is freestandingly disposed thereon. Even with articles of furniture which have only three support points, such as a three legged table, which inherently defines a stable support plane, the article working surface may be nevertheless tilted due to an error in the length of any of the three supports or a nonlevel or nonplanar support surface.

Some articles of furniture include adjustable pads on their lower supports, such pads often being in the common form of threaded bolts that terminate in support pads or heads. These threaded bolts are selectively displaceable into and out of the lower supports to provide an adjustable support or contact plane. Other known techniques of levelling items, such as heavy machinery, include the provision of a pair of freely sliding opposed wedges interconnected for selective movement by a threaded shaft. A number of approaches to furniture stabilizing suggest the use of a combination of wedges having ridges that intermesh with each other for adjustable stability.

Despite the existence of these and other varied levelling and stabilizing structures, it remains a common experience for a person to find an article of furniture, such as a table or the like, to be either not level or unstable. One possible reason is that the majority of articles of furniture do not include any adjustable stabilizing structure despite the known use of adjustable pads. Even where levelling structures are present on the article, they may be out of adjustment or may have been damaged through intense use. While inserting wedge-shaped objects, such as matchbooks, between an article of furniture and the underlying support surface provides a convenient way to temporarily level or stabilize the article, the wedge concept does not readily accommodate the relatively small adjustments typically needed and, where larger adjustments are required, continued stability may be compromised. Further, such wedges are likely to slide out from the space between the article and the support surface, thereby restoring the unstable or wobbly condition.

So-called bean-bags—cloth pouches containing a plurality of beans or similar large particulate objects that are relatively movable within the cloth pouch—have heretofore been known for use in positioning or supporting lightweight articles such as ash trays, cameras and the like. However, they are not effective to level or stabilize a heavyweight article, such as an article of furniture, because the mass of particles substantially flows in the general manner of a liquid within the cloth pouch and they accordingly do not provide adequate resistance against the force or pressure placed on them in such applications. Thus, they are by their very nature unable to provide sufficient and continuing stability to an article of furniture and the like when placed between the article and the underlying support surface.

SUMMARY OF THE INVENTION

It is accordingly an object of the present invention to provide a novel and useful levelling or stabilizing device which is conveniently placeable between a lower support portion of an article of furniture and an underlying ground or floor or support surface to prevent the article of furniture from unintendably wobbling and tipping and the like.

It is another object of the invention to provide a variable levelling or stabilizing device which can be selectively dynamically adjusted to fit into variable spaces between an article of furniture and a support surface.

Broadly, a resiliently-deformable bag containing a mass of a flowable particulate material is adapted for insertion between a support surface and the lower support structure of an article of furniture disposed on the support surface so as to stabilize the article of furniture on and relative to the surface. In a preferred embodiment, the device is formed having two envelopes, one of which is formed of an elastically deformable material, as for example rubber, and filled with a plurality of beads that are relatively movable therewithin so that the shape of the filled envelope may be altered to a particular configuration and/or contour and then so maintained by virtue of the conformed stretching of the elastically deformable envelope to accommodate changes in force or pressure that are placed on the filled envelope when disposed between an article and a supporting surface. A second envelope is defined by a nonelastic but flexible pouch disposed about the elastic first envelope and defining a volumetric space between the first and second envelopes for accommodating the elastic deformation of the first or inner envelope. Thus, in accordance with the invention, the stabilizing device is selectively disposed between the support structure and an underlying support surface, is compressed by the weight of the article of furniture, and thereby dynamically conforms to the size and contours of the spacing between the article and support surface to fill the space and level or otherwise stabilize the article at a desired position.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein like reference numerals identify similar elements throughout the several views.

DETAILED DESCRIPTION OF THE PRESENTLY PREFERRED EMBODIMENTS

The present invention is directed to a novel and useful device that is insertable between a lower portion of an article and an underlying ground or support surface to stabilize and/or level the article resting on the support surface. In accordance with the invention, the stabilizing device is constructed and configured for dynamically changing and then retaining its changed shape to appropriately stabilize an article of furniture, such as a table or the like, that is disposed on the surface for continued stability of the article.

Figure 1:
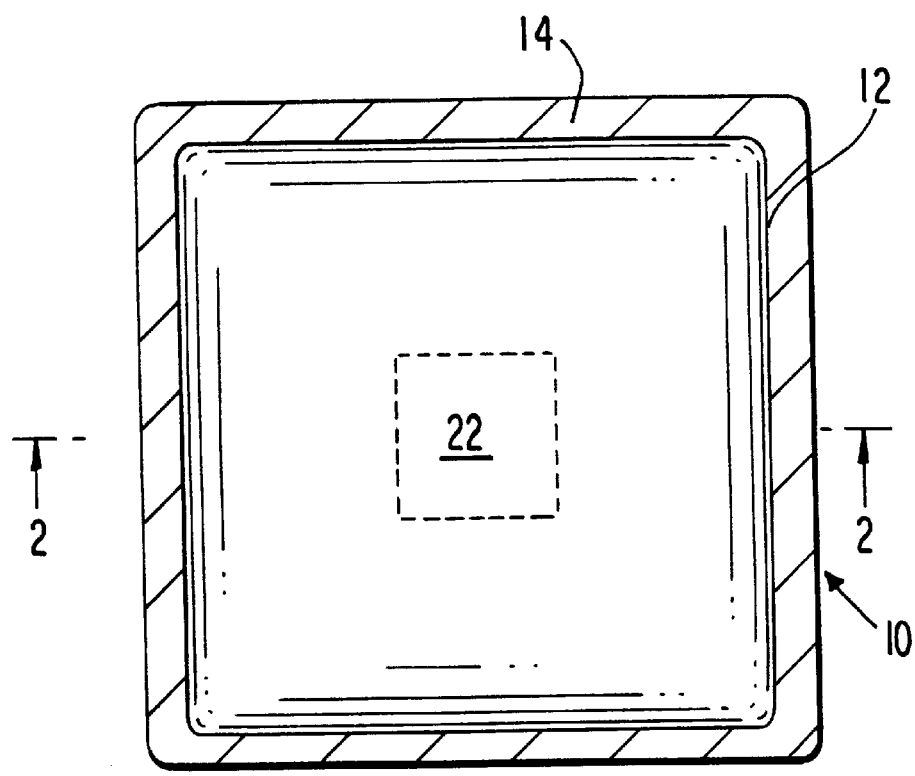
FIG. 1 is a top plan view of a levelling and stabilizing device constructed in accordance with the teachings of the present invention.
Figure 2:
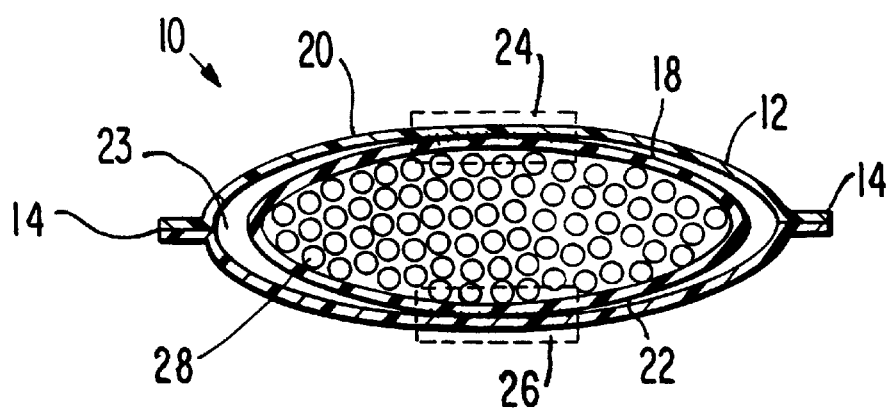
FIG. 2 is a cross-sectional view taken along the lines 2—2 in FIG. 1.

In a first embodiment shown in FIGS. 1 and 2, the inventive stabilizing device 10 comprises a first envelope 12 which has a generally continuous outer surface that provides opposite face portions for respective abutment with a lower portion or surface of a supported article and an underlying support surface in which the article is typically freestandingly disposed. The inventive device 10 may, as a general matter of design choice, be configured so as to have any suitable shape such, by way of illustrative example, as the rectangular contour shown in FIGS. 1 and 2. With initial reference to the embodiment of FIGS. 1 and 2, the envelope 12 is formed of a pair of substantially rectangular sheet-like members 20 and 22 fabricated of any durable material and joined along the resulting midline of the device 10 (i.e. between the upper and lower abutment face portions) at or closely proximate the marginal edges 14 as by sewing, adhesives or heat sealing or any other appropriate method or arrangement to define a closed, interior chamber. Preferably, the first envelope 12 is fabricated of relatively inelastic cloth or plastic sheet material which is flaccid and hence inelastically deformable. Alternatively, the envelope 12 may be formed of an elastic material although in such an embodiment the envelope 12 should be sized and configured so as to not significantly constrain outward expansive deformation of the second, inner, elastically deformable envelope 18 as hereinafter described.

Located within the first or outer envelope 12 is a second envelope or bladder 18 that is fabricated of a preferably elastically or otherwise resiliently deformable material within which a filler material 28 is captively contained. The second deformable envelope 18 may be similarly formed of a pair of sheets of material that are, by way of example, stitched or heat welded or adhesively secured together at or closely proximate their marginal edges to form the closed envelope or bladder within which the filler material 28 is held. The first envelope 12 and second envelope 18 are sized so as to define between the first and the second envelope a predetermined volumetric space 23 for accommodating the elastic deformation or resizing of the second envelope 18. In a most preferred construction of the device 10, the second deformable envelope 18 is formed as an integral bladder fabricated of rubber of suitable thickness and elasticity to provide the intended shape changing operability and associated functionality as will hereinafter become apparent.

The second envelope 18 defines an interior cavity that, as is preferred, is completely filled by a particulate filler material in the initial or unstretched or resiliently unde-formed state of the envelope 12—i.e. in a condition of nonuse of the stabilizing device 10. The filler material 28 comprises a plurality of particles or beads, preferably glass beads, although other types of bead-like materials having a smooth surface with a low coefficient of friction may be employed to render them relatively free flowing within the envelope 18 in accordance with the intended operative use of the invention. Toward that end, the filler material 28 may be foamed, hollow or solid. The beads preferably have a diameter in the range of about 0.75 to about 2 millimeters, more preferably between about 0.75 and about 1.5 millimeters, and most preferably of about 1 millimeter. While the filler material should substantially, fully and completely occupy the interior cavity or space within the deformable envelope 18 in its initial or substantially unstretched or normal condition, it will be evident that it should not be so fully packed within the cavity as to inhibit adequate fluidic mobility of the individual beads or particles relative to one another to thereby impose an undue constraint upon the conformability of the stabilizing device 10.

In a preferred form of the inventive stabilizing device 10, the interior chamber of the first or outer envelope 12 is sized so as to be larger than the unstretched or undeformed volume of the second or inner envelope or bladder 18 by a predetermined amount sufficient to accommodate anticipated volumetric deformation and resizing of the inner envelope 18 as it is displaced and stretched under load without significant restraint from the outer envelope 12. To inhibit undesired migration or shifting of the deforming bladder 18 within the envelope 12 during normal use, the two envelopes may be joined one to the other at one or more distinct and separated locations or areas. As shown in FIG. 2 and presently preferred, a portion of each of the top and bottom sheet-like members forming the outer envelope 12 and spatially proximal or positionally corresponding regions on the outer surface of the elastically deformable inner envelope 18 may be joined for this purpose by small beads of adhesive at spaced apart areas 24 and 26.

The overall dimensioning of the stabilizing device 10 may be determined as a function of the particular articles or types of articles to be supportedly stabilized and may vary considerably without departing from the scope and contemplation of the invention. For example, a stabilizing device 10 for use under a table leg may be about 2 inches wide×2 inches long×0.5 inches thick in its initial or undeformed condition.

Figure 5:
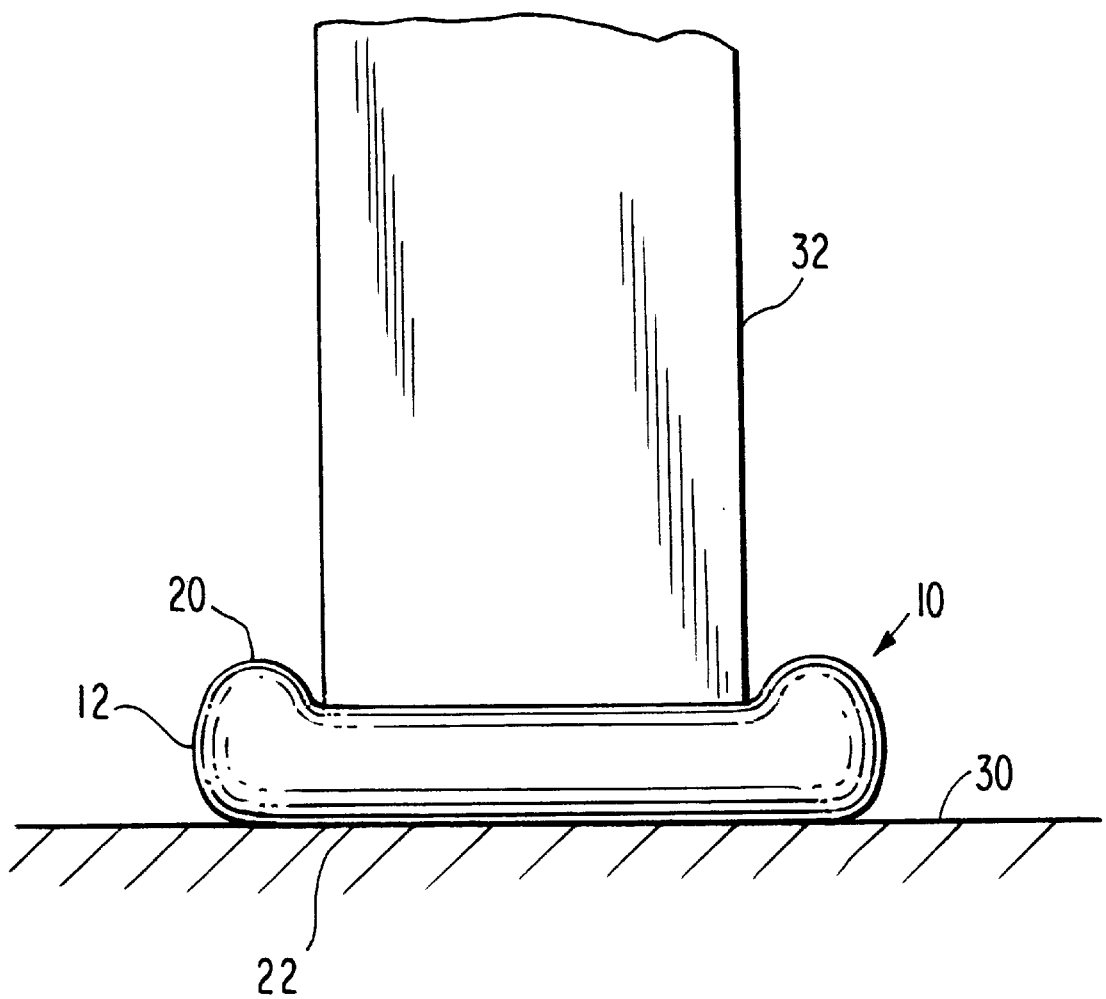
FIG. 5 is a side elevational view of the device of FIG. 3 disposed in article stabilizing relation between a table leg and an underlying support surface.

In use, with reference to FIG. 5, the stabilizing device 10 is inserted between a lower support portion of an article of furniture, such as a table leg 32, and an underlying support surface such as a floor 30 to fill the space that would otherwise exist between the table leg and floor and thereby stabilize the article of furniture against tipping, rocking or other unwanted wobbling movement. To do so, the table or article may be slightly elevated or lifted to accommodate the initially undeformed stabilizing device 10 between the article leg and the floor, i.e. so that the table leg rests directly on the device 10 which is itself positioned on the floor. As the table is then lowered and its leg presses against the device 10, the bead-like filler material 28 within the inner deformable envelope 18 is redistributed in and throughout its interior cavity until the space or gap is completely filled by the device 10. The elasticity of the deformable envelope 18 accommodates the free movement and redistribution of the filler material 28 and its resilience provides adequate weight resistance to inhibit further distortion of the envelope 18 once the gap or space has been filled and the leg is thereby supported so as to maintain the stability of the table.

The spacing between the inner envelope 18 and outer envelope 12 permits and accommodates the expansion and resizing of the inner envelope 18 as the filler method is redistributed within and throughout the envelope 18.

Figure 3:
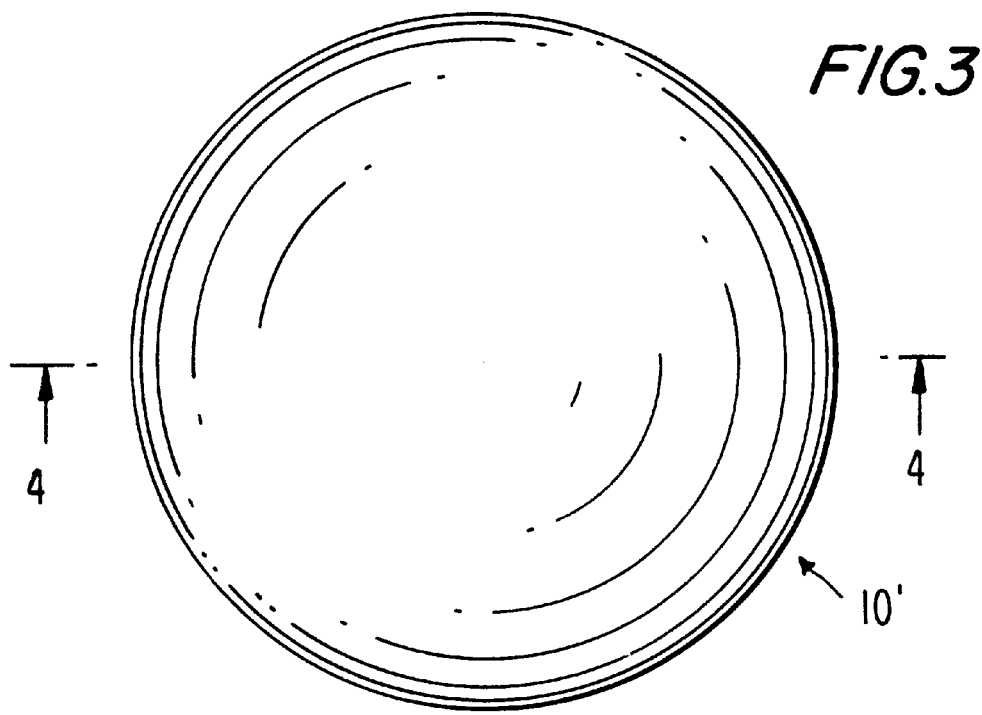
FIG. 3 is a top plan view of a modified form of the levelling and stabilizing device of FIGS. 1 and 2.
Figure 4:
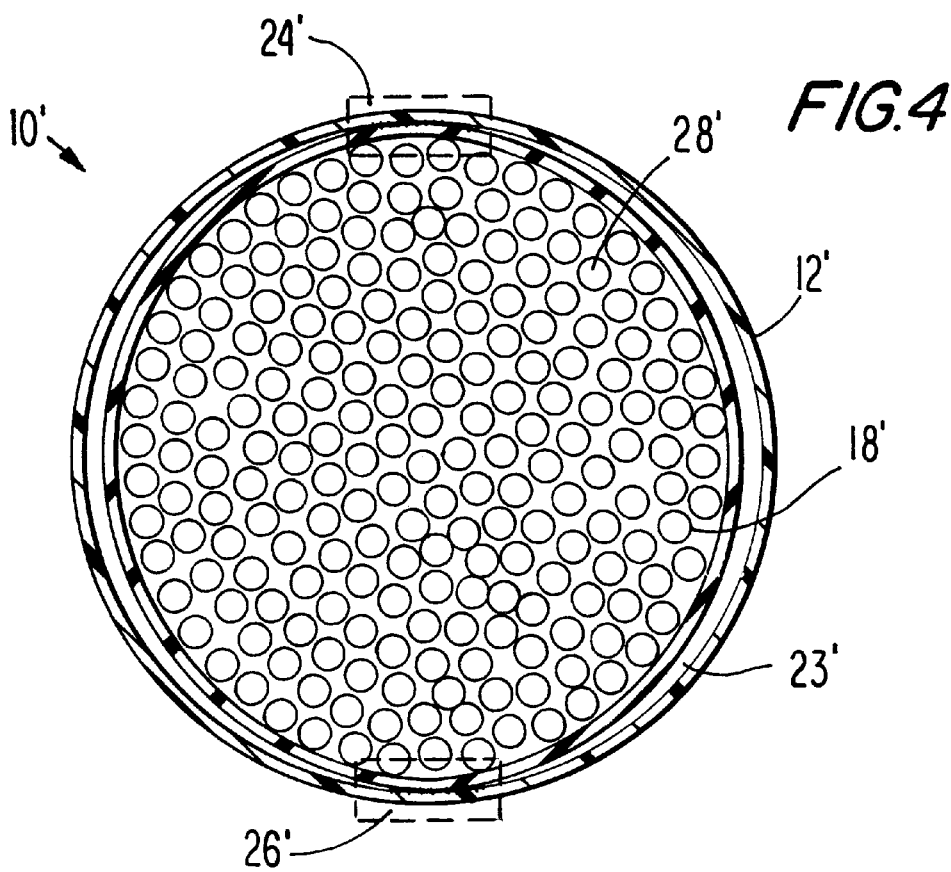
FIG. 4 is a cross-sectional view taken along the lines 4—4 in FIG. 3.

In a second embodiment of the invention shown in FIGS. 3 and 4, the stabilizing device 10' is configured to form a generally spherical envelope 12'. As in the embodiment of FIGS. 1 and 2, the spherical outer envelope 12' may be fabricated by marginally joining a plurality of arcuate sheets or segments to one another by heat sealing, sewing, adhesives or any other suitable method to define a closed, spherical interior chamber 23'. And, as in the first embodiment, a resiliently deformable inner or second envelope or bladder 18' carrying a particulate bead-like filler method 28' is conformed within the outer envelope 12' in this second embodiment, however, the inner envelope 18' is, like the outer envelope 12', of generally spherical configuration. As shown in FIG. 4, a portion of each of the top and bottom of the outer envelope 12' and corresponding regions on the outer surface of the elastically deformable envelope 18' may be joined by small beads of adhesive at spaced apart areas 24' and 26'. All other structural features and relationships are otherwise as described in connection with the first embodiment, as is the intended manner of its use. Depending upon the particular use to which the stabilizing device of FIGS. 3 and 4 is intended, the outer envelope 12' may have a diameter in the range of approximately ½ inch to approximately 2 inches.

In alternate forms of the inventive stabilizing device 10, the filler material substantially filling the second or inner envelope may comprise a relaively thick or thickened, predeterminately flowable, gel-like nonparticulate material such as a hydrophilic hydrogel. One example of a suitable gel for use in substantially filling the elastically-bounded inner envelope of the device 10 is Aquatrix, a nonreversible hydrophilic gel available from Hydromer, Inc. of Branchburg, N.J. and specifically intended for use in medical applications, although numerous other gels of significantly different formulation and/or intended usage are equally suitable and may be selected on the bases of availability and cost and as a general matter of design choice. A gel to be used as the filler material of the inventive stabilizing device should, in any event, generally satisfy the requirements and have the attributes herein described in respect of the preferred flowable particulate material.

Thus, while there have been shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

I claim:

1. A stabilizing device for insertion between a lower support structure of an article of furniture and an underlying support surface for dynamically filling a gap between the support structure and support surface to stabilize the article on the support surface, said device comprising a first deformable envelope defining first and second spaced apart surfaces for respective contact with the article support structure and the underlying support surface; a second elastically deformable envelope enclosed within said first envelope; securement means for attaching said second envelope to said first envelope to prevent relative displacement of the second envelope within said first envelope; and a fluidically-flowable material contained within and substantially filling said second deformable envelope for flowable redistribution within and resilient deformation of said second envelope within said first envelope as the stabilizing device is placed and pressed between the article support structure and the underlying support surface to dynamically fill the gap between the support structure and support surface to stabilize the article.

2. The stabilizing device according to claim 1, wherein said fluidically-flowable material comprises a plurality of bead-like particles substantially filling said second deformable envelope.

3. The stabilizing device according to claim 1, wherein said fluidically-flowable material comprises a predeterminately-flowable gel substantially filling said second deformable envelope.

4. The stabilizing device according to claim 3, wherein said gel comprises a hydrophilic gel.

5. The stabilizing device according to claim 1, wherein each of said first and second envelopes are sized so as to define between said first and second envelopes a predetermined volumetric space for accommodating, within said first envelope, elastic deformation and resizing of said second envelope as the filler material contained within said second envelope is redistributed as the stabilizing device is pressed between the article support structure and the underlying support surface to stabilize the article.

6. The stabilizing device according to claim 1, wherein said second deformable envelope is formed of rubber.

7. The stabilizing device of claim 2, wherein said plurality of bead-like particles comprises a multiplicity of smooth-surfaced, substantially circular beads.

8. The stabilizing device according to claim 7, wherein said beads have diameters in a range from about 0.75 millimeter to about 2 millimeters.

9. The stabilizing device according to claim 7, wherein said beads have diameters in a range from about 0.75 millimeter to about 1.5 millimeters.

10. The stabilizing device according to claim 7, wherein said beads have diameters of about 1 millimeter.

11. The stabilizing device of claim 7, wherein said beads comprise glass beads.

12. The stabilizing device of claim 7, wherein said beads comprise solid glass beads.

13. The stabilizing device of claim 7, wherein said beads comprise hollow glass beads.

\* \* \* \* \*